US00RE49409E

(19) United States
(12) Reissued Patent
Kim

(10) Patent Number: US RE49,409 E
(45) Date of Reissued Patent: *Feb. 7, 2023

(54) REFRIGERATOR AND MANUFACTURING METHOD OF THE SAME

(71) Applicant: LG Electronics Inc., Seoul (KR)

(72) Inventor: Pansoo Kim, Seoul (KR)

(73) Assignee: LG ELECTRONICS INC., Seoul (KR)

( * ) Notice: This patent is subject to a terminal disclaimer.

(21) Appl. No.: 16/248,621

(22) Filed: Jan. 15, 2019

Related U.S. Patent Documents

Reissue of:
(64) Patent No.: 8,523,304
Issued: Sep. 3, 2013
Appl. No.: 12/863,050
PCT Filed: Dec. 17, 2008
PCT No.: PCT/KR2008/007498
§ 371 (c)(1),
(2) Date: Jul. 15, 2010
PCT Pub. No.: WO2009/104859
PCT Pub. Date: Aug. 27, 2009

U.S. Applications:
(63) Continuation of application No. 14/843,719, filed on Sep. 2, 2015, now Pat. No. Re. 47,284, which is an application for the reissue of Pat. No. 8,523,304.

(30) Foreign Application Priority Data

Feb. 21, 2008 (KR) ..... 10-2008-0015776

(51) Int. Cl.
*A47B 96/04* (2006.01)
*A47F 3/04* (2006.01)
(Continued)

(52) U.S. Cl.
CPC ..... *A47F 3/04* (2013.01); *B23P 15/26* (2013.01); *F25D 29/005* (2013.01); *F25D 2400/361* (2013.01); *Y10T 29/49359* (2015.01)

(58) Field of Classification Search
CPC ..... A47F 3/04; B23P 15/26; F25D 29/005; F25D 2400/361; Y10T 29/49359
See application file for complete search history.

(56) References Cited

U.S. PATENT DOCUMENTS 2,766,856 A * 10/1956 Nelsson ..... 49/246
5,147,127 A 9/1992 Honda et al.
(Continued)

FOREIGN PATENT DOCUMENTS

CN 1940424 A 4/2007
CN 101097790 A 1/2008
(Continued)

OTHER PUBLICATIONS

English translation of JP 2002-039673, published Feb. 6, 2002.
English translation of KR10-20070034835.*

*Primary Examiner* — Stephen J. Ralis
(74) *Attorney, Agent, or Firm* — Birch, Stewart, Kolasch & Birch, LLP

(57) ABSTRACT

[The present embodiment provides a refrigerator. The refrigerator according to the present embodiment] *A refrigerator* includes a panel member forming at least a portion of the exterior of the refrigerator, an inner case of which at least portion is spaced from the panel, a display case provided at one side of the panel member, insulating material filled in space between the panel member and the inner case, and a display unit mounted on the display case after the filling of the insulating material is completed.

18 Claims, 5 Drawing Sheets

(51) Int. Cl.
*B23P 15/26* (2006.01)
*F25D 29/00* (2006.01)

(56) References Cited

U.S. PATENT DOCUMENTS

| | | | | |
|---|---|---|---|---|
| 6,256,075 | B1 * | 7/2001 | Yang | 348/843 |
| 6,310,767 | B1 * | 10/2001 | Spear et al. | 361/679.24 |
| 6,480,243 | B2 * | 11/2002 | Yamamoto | 348/836 |
| 6,575,541 | B1 * | 6/2003 | Hedrick et al. | 312/223.1 |
| 7,046,310 | B2 * | 5/2006 | Lee | 348/836 |
| 7,155,923 | B2 * | 1/2007 | Nam et al. | 62/259.2 |
| 7,260,954 | B2 * | 8/2007 | Jang et al. | 62/285 |
| 7,516,625 | B2 * | 4/2009 | Kwon | 62/440 |
| 7,942,013 | B2 * | 5/2011 | Kim | 62/125 |
| 8,109,580 | B1 * | 2/2012 | Didier et al. | 312/245 |
| 8,375,639 | B2 * | 2/2013 | Lee et al. | 49/463 |
| 8,770,684 | B2 * | 7/2014 | Kim | B23P 15/26 312/405.1 |
| RE47,284 | E * | 3/2019 | Kim | F25D 23/028 |
| 2004/0177624 | A1 * | 9/2004 | Wo | 62/125 |
| 2004/0183413 | A1 * | 9/2004 | Koo | 312/401 |
| 2005/0097912 | A1 * | 5/2005 | Nam et al. | 62/331 |
| 2005/0146250 | A1 * | 7/2005 | Chung et al. | 312/7.2 |
| 2005/0190309 | A1 * | 9/2005 | Takita et al. | 348/840 |
| 2006/0201043 | A1 * | 9/2006 | Kim et al. | 40/725 |
| 2007/0056303 | A1 * | 3/2007 | Choi et al. | 62/259.2 |
| 2007/0096606 | A1 * | 5/2007 | Ryu | 312/7.2 |
| 2008/0164796 | A1 * | 7/2008 | McCoy et al. | 312/405 |
| 2008/0165998 | A1 * | 7/2008 | LeClear et al. | 381/345 |
| 2008/0202844 | A1 * | 8/2008 | LeClear et al. | 181/148 |
| 2008/0231159 | A1 * | 9/2008 | Lee et al. | 312/405 |
| 2008/0238279 | A1 * | 10/2008 | Jang | 312/405 |
| 2008/0297012 | A1 * | 12/2008 | Cooper | 312/7.2 |
| 2008/0297013 | A1 * | 12/2008 | Iwai et al. | 312/7.2 |
| 2010/0019639 | A1 * | 1/2010 | Son | 312/403 |
| 2010/0024466 | A1 * | 2/2010 | Kwon | 62/449 |
| 2010/0066226 | A1 * | 3/2010 | Luisi et al. | 312/405.1 |
| 2012/0099255 | A1 * | 4/2012 | Lee et al. | 361/679.01 |

FOREIGN PATENT DOCUMENTS

| | | | |
|---|---|---|---|
| GB | 2186311 | A | 8/1987 |
| JP | 3-36481 | A | 2/1991 |
| JP | 2000-88445 | A | 3/2000 |
| JP | 2001-153538 | A | 6/2001 |
| JP | 2002-039673 | A | 2/2002 |
| JP | 2002-90059 | A | 3/2002 |
| JP | 2007-298242 | A | 11/2007 |
| KR | 20-2001-0001242 | U | 1/2001 |
| KR | 10-2005-0081017 | A | 8/2005 |
| KR | 10-0582082 | B1 | 5/2006 |
| KR | 10-0634365 | B1 | 10/2006 |
| KR | 10-0634367 | B1 | 10/2006 |
| KR | 10-2007-0034835 | A | 3/2007 |
| WO | WO 03/081153 | A1 | 10/2003 |
| WO | WO 2007/011178 | A1 | 1/2007 |
| WO | WO 2007/060188 | A2 | 5/2007 |
| WO | WO 2007/078149 | A1 | 7/2007 |

* cited by examiner

REFRIGERATOR AND MANUFACTURING METHOD OF THE SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This application is a Continuation Reissue Application of U.S. patent application Ser. No. 14/843,719 filed on Sep. 2, 2015, which is a Reissue Application of U.S. Pat. No. 8,523,304 issued Sep. 3, 2013, which is the national phase of PCT International Application No. PCT/KR2008/007498 filed on Dec. 17, 2008, and which claims priority to Application No. 10-2008-0015776 filed in the Republic of Korea on Feb. 21, 2008. More than one reissue application has been filed for the reissue of U.S. Pat. No. 8,523,304: the present application, U.S. patent application Ser. No. 16/248,621 and U.S. patent application Ser. No. 14/843,719.*

TECHNICAL FIELD

The present embodiment relates to a refrigerator and a manufacturing method of the same.

BACKGROUND ART

A refrigerator is an apparatus storing for foods at a low temperature. The refrigerator includes a main body in which a storage chamber is formed and a door coupled to the main body to open/close the storage chamber. And, a display unit displaying at least an operation state of the refrigerator is provided in the main body or the door.

DISCLOSURE OF INVENTION

Technical Problem

An object of the present embodiment is to provide a refrigerator that is easily mounted with a display unit, and has a simple structure and a low manufacturing cost.

Technical Solution

According to one aspect of the present embodiment, there is provided a refrigerator having a main body in which a storage chamber is formed and a door to open/close the storage chamber, the refrigerator comprising: a panel member forming at least a portion of the exterior of the refrigerator; an inner case of which at least portion is spaced from the panel; a display case provided at one side of the panel member; insulating material filled in space between the panel member and the inner case; and a display unit mounted on the display unit after the filling of the insulating material is completed.

According to another aspect of the present embodiment, there is provided a manufacturing method of a refrigerator comprising: filling insulating material between an inner case and a panel member forming a portion of the exterior of the refrigerator; and inserting a display unit into space between the insulating material and the panel member.

According to another aspect of the present embodiment, there is provided a manufacturing method of a refrigerator comprising: forming a mounting space for mounting a display unit and an insulation space for insulating between an inner case and a panel member forming a portion of the exterior of the refrigerator; filling the insulating material in the insulation space; mounting the display unit on the mounting space; and covering the display unit in a state where the display unit is mounted.

Advantageous Effects

With the proposed embodiment, the display unit is mounted on an inner side of the door or an inner side of the body so that the display unit is not exposed to the outside of the front panel, making it possible to improve an esthetic sense of the front panel.

Also, the display unit is inserted into the door or the body after the filling of insulating material is completed, making it possible to simplify assembly of the door or the body and to reduce a manufacturing cost.

The display unit can be slidingly drawn-out from the door or the main body, making it possible to check and repair the display unit.

BRIEF DESCRIPTION OF THE DRAWINGS

The above and other objects, features and advantages of the present invention will become apparent from the following description of preferred embodiments given in conjunction with the accompanying drawings, in which.

MODE FOR THE INVENTION

Hereinafter, an embodiment will be described in detail with reference to the accompanying drawings.

Figure 1:
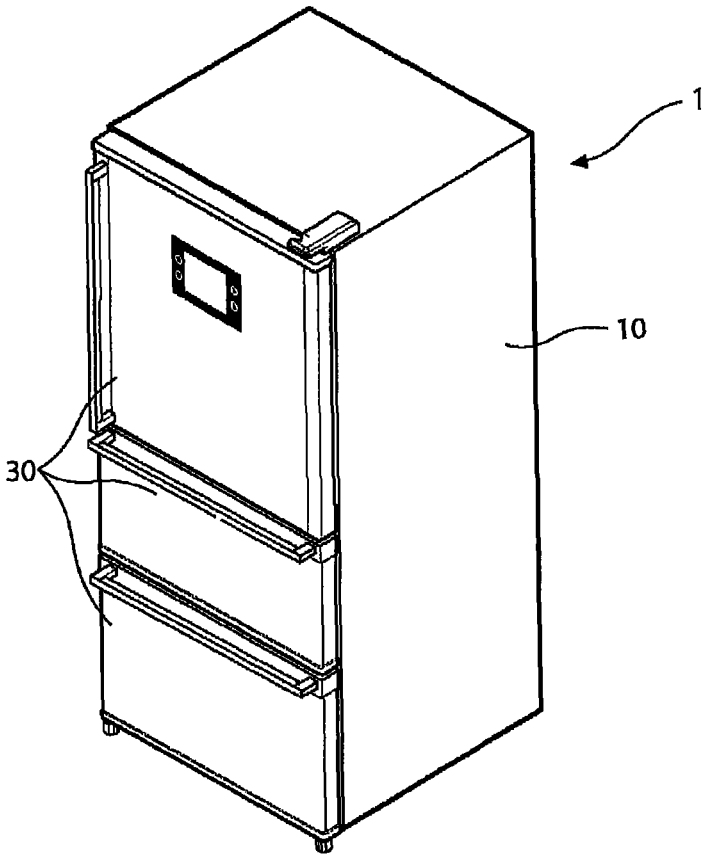
FIG. 1 is a perspective view of the exterior of a refrigerator according to a first embodiment.
Figure 2:
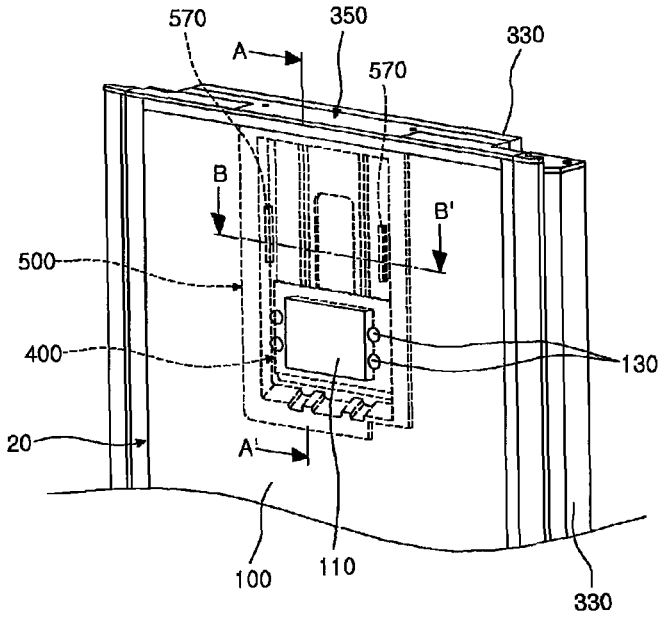
FIG. 2 is a partial perspective view of a refrigerator door according to a first embodiment.

FIG. 1 is a perspective view of the exterior of a refrigerator according to a first embodiment, and FIG. 2 is a partial perspective view of a refrigerator door according to a first embodiment.

Referring to FIGS. 1 and 2, the refrigerator 1 according to the present embodiment includes a main body in which a storage chamber is formed, and at least one door 30 coupled movably to the main body 10 to open/close the storage chamber.

Although not shown, the main body 10 includes a panel member and an inner case, wherein a heat insulator such as expanded polystyrene (EPS) is foamly filled between the panel member and the inner case.

A display unit 400 displaying at least an operation state of the refrigerator 1 is provided on the door. And, the display unit 400 allows an operation condition of the refrigerator to be selected by means of a touch method by way of example.

A display window 110 allowing information displayed by the display unit 400 to be shown is formed on the front surface of the door corresponding to the position of the display unit through a front surface of the door 30. The display window 110 is formed to be transparent or translucent.

Manipulating parts 130 guiding a user's touch are displayed on both right and left sides based on the display window 110 of the door 30. The manipulating parts 130, which are formed in the portions corresponding to sensing units 450 [(see FIG. 5)] (*see FIG. 3*) of the display unit 400, are printed or formed in a rugged shape on the front surface of the door 30 so that they can guide the positions of the sensing units 450.

And, sensors constituting the sensing units 450, which are capacitance sensors, sense microcurrent generated at the time of user's touch to generate input signals. Therefore, if a user touches the manipulating parts 130, the user's manipulation is sensed in the sensing units 450.

Figure 3:
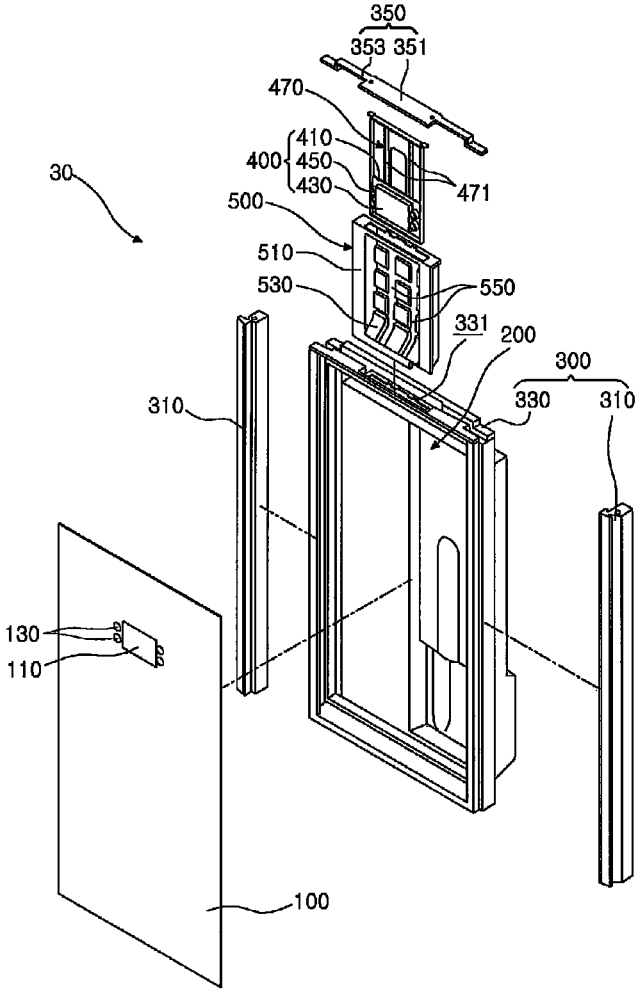
FIG. 3 is an exploded perspective view of a refrigerator door according to a first embodiment.
Figure 4:
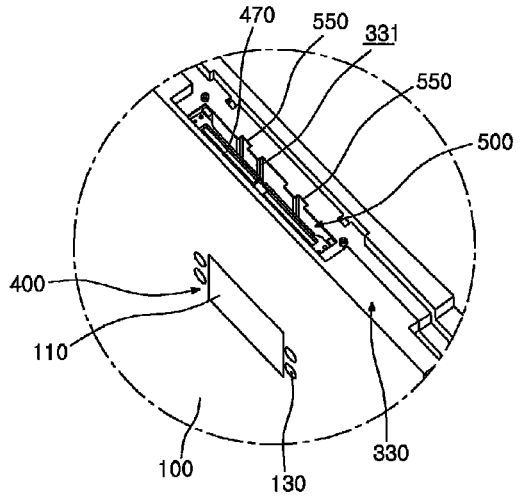
FIG. 4 is a partial perspective view showing a structure that a display unit according to a first embodiment is mounted to a refrigerator door.
Figure 5:
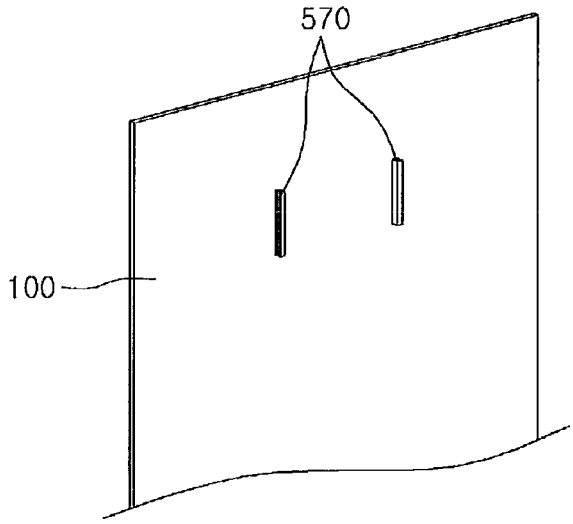
FIG. 5 is a rear perspective view of a front plate constituting a refrigerator door according to a first embodiment.

FIG. 3 is an exploded perspective view of a refrigerator door according to a first embodiment, FIG. 4 is a partial perspective view showing a structure that a display unit according to a first embodiment is mounted to a refrigerator door, and FIG. 5 is a rear perspective view of a front plate constituting a refrigerator door according to a first embodiment.

Referring to FIGS. 3 to 5, the door 30 includes a panel member 100 forming at least a portion of the exterior and an inner case 200 forming the shape of a rear surface. And, the panel member 100 is spaced from at least a portion of the inner case to form an insulation space and the insulation space is filled with insulating material 900.

The panel member 100 and the inner case 200 are coupled to each other by deco members 300, wherein the deco members 300 are coupled along edge boundaries of the panel member 100 and the inner case 200 to form a boundary surface of the door 30.

The panel member 100 is formed of tempered glass or plastic material, in an approximate rectangular plate shape, and a pattern is printed on the rear surface of the panel member 100.

The display window 110 is formed on the panel member 100 to be transparent or translucent. And, as described above, the manipulating parts 130 are formed on both right and left sides of the display window 110.

In the panel member 100, portions except the position of the display window 110 are colored and a separate printing job may be performed on the positions of the manipulating parts 130.

The inner case 200 is formed in a shape corresponding to the opening portion of a storage chamber formed in the main body 10. And, although not shown, gasket is provided to an edge of the door rider so that the storage chamber can keep airtight.

The deco member 300 includes a plurality of side decoes forming right and left sides of the door 30, and a plurality of [cab] *cap* decoes 330 forming up and down surfaces of the door 30.

Among the plurality of [cab] *cap* decoes 330, an inserting part 331 is formed on an upper side deco. The inserting part 331 provides a path for inserting the display unit 400.

A display case 500 guiding the insertion of the display unit 400 and supporting the display unit 400 is coupled to the upper side deco. And, the display unit 400 is slidingly mounted to the display case 500, penetrating through the inserting part 331 of the upper side deco.

The display case 500 is formed so that its front surface and upper surface are opened.

The display case 500 is coupled to [the cab deco 330 (upper side deco)] *an upper side deco of the plurality of cap decoes 330* by a coupling member such as a screw.

And, the upper side deco is coupled to the panel member 100 and the inner case 200 in a state where the display case 500 is coupled to the upper side deco. Then, the display case 500 is positioned between the panel member 100 and the inner case 200, in a state where the display case 500 is coupled to the upper deco.

The front surface of the display case 500 is closely adhered to the rear surface of the panel member 100.

A bending part 510 is formed on the boundary of the opened front surface of the display case 500. The bending part 510 allows the opened front surface of the display case 500 to be closely adhered to the rear surface of the panel member 100. As the bending part 510 is closely adhered to the panel member 100, a separated space (display unit mounting space) isolated from the insulation space where the insulating material 900 is foamed may be formed on an inner side of the door 30.

A plurality of pressure parts 530 are formed on the inner side surface of the display case 500. The pressure parts 530 are projected forward from the inner side surface of the display case 500. The pressure parts 530 are closely adhered to the display unit 400 in a state where the display unit 400 is mounted to the display case 500 to pressurize the display unit 400 towards the panel member 100. As the pressure parts pressurize the rear surface of the display unit, the front surface of the display unit 400 can be closely adhered to the rear surface of the panel member 100 so that a back and forth movement of the display unit is prevented.

Guide rails 550 are formed on the inner surface of the display case 500. The guide rails 550 are formed by embedding a portion of the display case 500 backward and are extended upward and downward.

A plurality of guide rails 550 may be provided for a more stable sliding of the display unit 400, wherein the plurality of guide rails 550 are spaced right and left at a predetermined interval.

Meanwhile, a plurality of mounting guides 570 are provided on the rear surface of the panel member 100. The plurality of mounting guides 570 may, for example, be formed of plastic material to be coupled to the rear surface of the panel member, wherein the plurality of mounting guides 570 are spaced right and left.

The mounting guides 570 are coupled to the display unit 400 to guide the right and left positions to which the display unit 400 is inserted. And, the right and left movement of the display unit 400 can be prevented in a state where the display unit 400 is coupled to the mounting guide 570.

Of course, the mounting guides 570 may also be formed on the display case 500 rather than on the rear surface of the panel member 100.

Meanwhile, the display unit 400 includes a PCB board 410, a display part 430, a sensing part 450, and a unit guide 470. The PCB board 410 electrically connects the sensing part 450 to the display part 430 and controls each driving thereof.

The display part 430 is positioned in a central portion of the PCB board 410 and displays at least an operation state to the external. The display part 430 may, for example, be a LCD.

The sensing part 450 receives operating signals by a user's touch as described above.

The display part 430 and the sensing part 450 are mounted on the PCB board 410, and the [PCT] *PCB* board 410 is mounted on the unit guide 470. And, the unit guide 470 is slidingly mounted on the display case 500.

Guide parts 471 projected backward are formed on the rear surface of the unit guide 470. And, the guide parts 471 are formed to be vertically long and are inserted into the inner sides of the guide rails 550.

Guide ribs 473 are formed on both right and left stages of the unit guide 470. The guide ribs 473 are coupled to the mounting guide 570.

A cover member 350 is coupled to the upper side deco. The cover member 350 selectively covers the inserting part 331. The cover member 350 includes a shielding part 351 shielding the inserting part 331 and a mount part 353 extended to both sides of the shielding part 351 to be coupled to the upper side deco.

In the present embodiment, the display unit 400 is described to be inserted into the inside of the door by penetrating through the upper side deco. However, the display unit 400 may also be inserted into the door by penetrating through a lower side deco or through the side deco 310.

Figure 6:
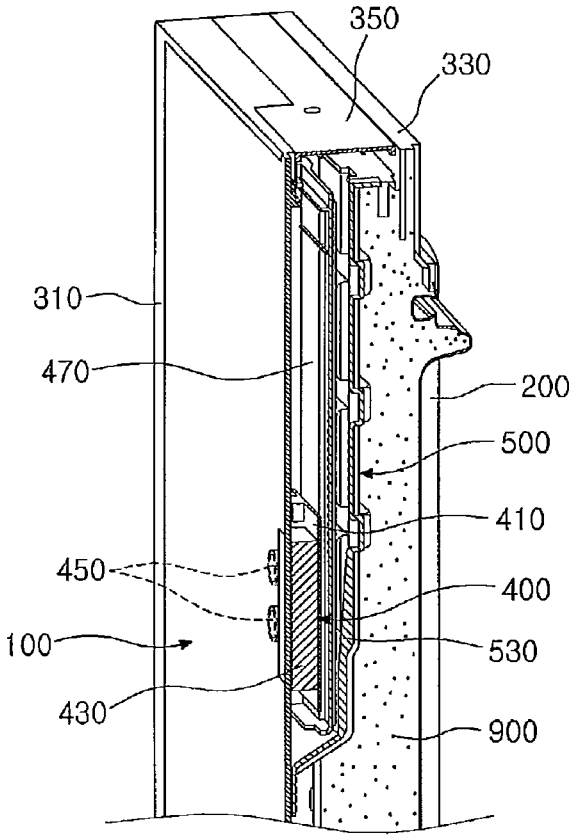
FIG. 6 is a cross-sectional view taken along line A-A' of FIG. 2.
Figure 7:
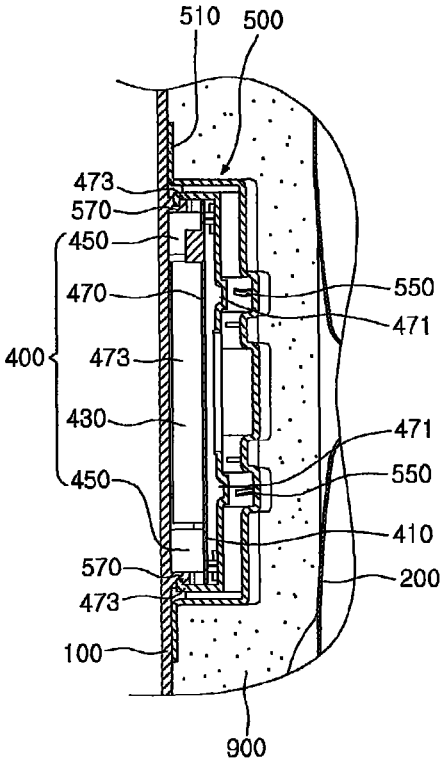
FIG. 7 is a cross-sectional view taken along line B-B' of FIG. 2.

FIG. 6 is a cross-sectional view taken along line A-A of FIG. 2, and FIG. 7 is a cross-sectional view taken along line B-B' of FIG. 2.

Referring to FIGS. 6 and 7, an assembling method of the door will be described.

First, in order to assemble the door 30, the panel member 100 and the door rider 200 are prepared. And, the panel member 100 and the inner case 200 are coupled to the side deco 310.

And, the panel member 100 and the inner case 200 are coupled to the lower side deco. And, after coupling the display case 500 to the upper side deco, the panel member 100 and the inner case 200 are coupled to the upper side deco 130. Then, an insulation space for filling insulating material 900 and a mounting space for mounting the display unit 400 are partitionally provided on the inner side of the door 30.

After the respective decoes 310 and 330 are coupled to the panel member 100 and the inner case 200, the insulating material 900 is foamly filled excepting for the space for mounting the display unit 400.

After the foam filling of the insulating material 900 on the inner side of the door 30 is completed, the display unit 400 is inserted into the inserting part 331 of the upper side deco. Then, the display unit 400 is coupled to the respective mounting guides 570 to be slidingly mounted to the display case 500.

After the display unit 400 is mounted on the display case 500, the cover member 350 is coupled to the upper side deco, thereby completing the assembling of the door.

Meanwhile, when the display unit 400 is checked or is trouble, the display unit 400 can be drawn out by the isolating cover member 350 from the upper side deco and then allowing the unit guides 470 to be slid upward. And, after the work is completed, the unit guide can be inserted again into its original position.

With the present embodiment, the display unit is mounted on the inner side of the door so that the display unit is not exposed to the outer side of the front panel, having an advantage that an esthetic sense of the front panel is improved.

Also, the display unit is inserted to the door after the filling of the insulating material is completed, having advantages that the assembling of the door is simplified and a manufacturing cost is reduced.

Also, the display unit can be slidingly drawn out from the door, having an advantage that the display unit can be checked and repaired.

Figure 8:
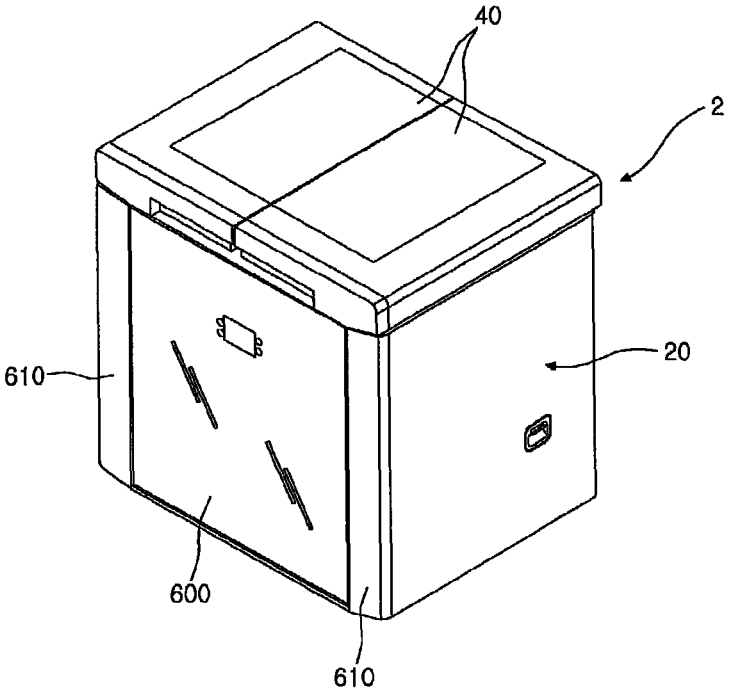
FIG. 8 is a perspective view of a refrigerator according to a second embodiment.
Figure 9:
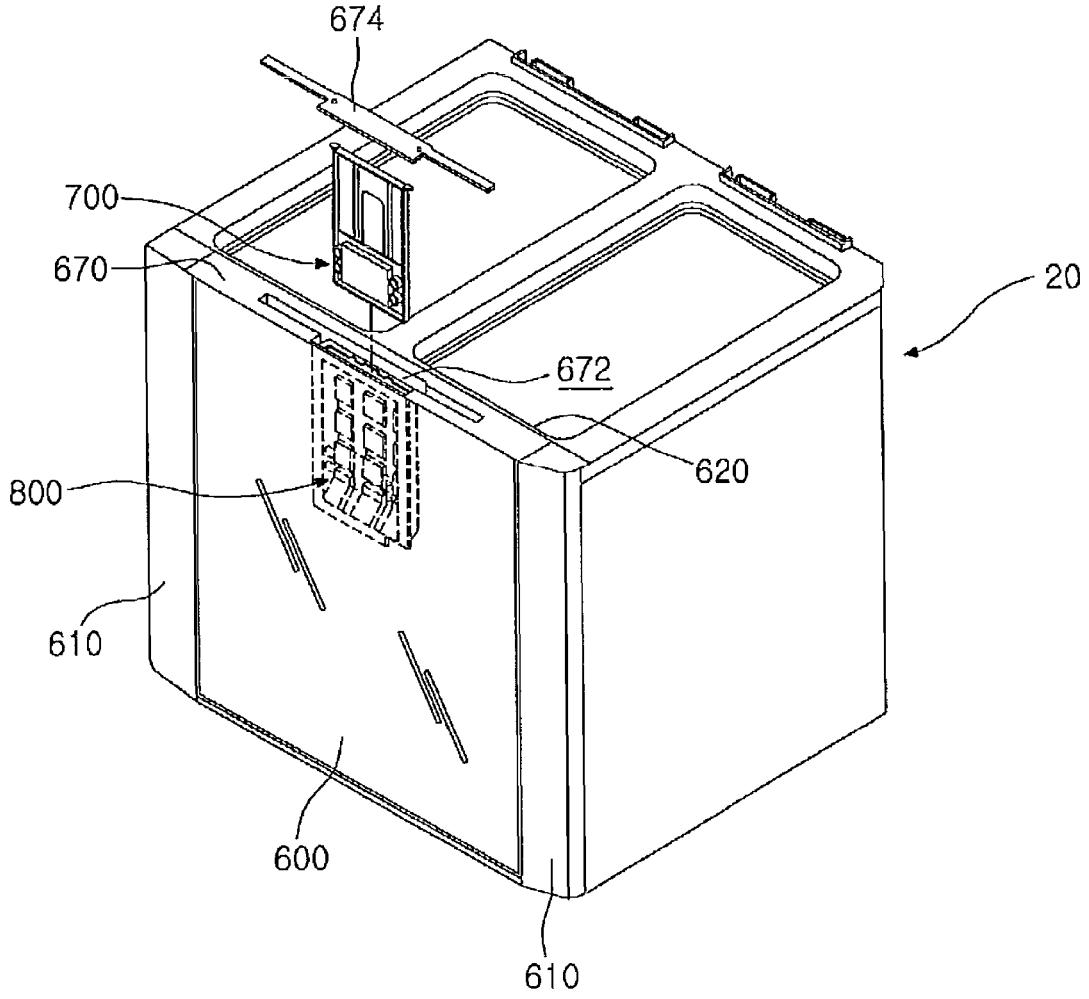
FIG. 9 is a perspective view showing a structure that a display unit according to a second embodiment is inserted to a refrigerator main body.

FIG. 8 is a perspective view of a refrigerator according to a second embodiment, and FIG. 9 is a perspective view showing a structure that a display unit according to a second embodiment is inserted to a refrigerator main body.

The present embodiment is the same as the first embodiment, excepting for the position on which the display unit is mounted. Therefore, only the characteristic portion of the present embodiment will be described hereinafter.

Referring to FIGS. 8 and 9, the refrigerator 2 according to the present embodiment includes a main body 20 in which a storage chamber is formed, and a door [4] *40* coupled to an upper side of the main body 20 to open/close the storage chamber.

The main body 20 includes a panel member 600 forming at least a portion of the exterior and an inner case 620. Insulating material is foamly filled between the panel member 600 and the inner case 620.

The panel member 600 may, for example, be formed of tempered glass or plastic material, and the position of the panel member may be fixed by a side deco 610.

And, a [cab] *cap* deco 670 is coupled to an upper side of the panel member 600. An inserting part 672 for inserting a display unit 700 is inserted is formed on the [cab] *cap* deco. And, a display case [700] *800* for mounting the display unit 700 is coupled to the [cab] *cap* deco 670. Also, a cover member 674 for covering the inserting part is coupled to the [cab] *cap* deco. And, the display unit is slidingly mounted to the display case after the insulating material between the panel member and the inner case is foamly filled.

The shape and coupling method of the display case are the same as those of the first embodiment so that the detailed description thereof will be omitted. Also, the mounting method of the display is the same as that of the first embodiment so that the detailed description thereof will be omitted.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:

[1. A refrigerator having a main body in which a storage chamber is formed and a door to open/close the storage chamber, the door comprising:

a panel member forming at least a portion of a front exterior of the door, a pattern on a rear surface of the panel member;

a display case installed on a rear surface of the panel member and having a display mounting space;

an inner case, forming at least a portion of a rear exterior of the door;

a connecting member forming at least a portion of a side exterior of the door, the connecting member having a display insertion hole;

insulating material filled in a space defined by the panel member, the inner case, and the connecting member, the insulating material being in contact with the panel member, the inner case, the connecting member and the display case;

a display unit passing through the display insertion hole and mounted on the display mounting space after the filling of the insulating material is completed, the display unit having a display part, a sensing part and a unit guide, wherein the display part and the sensing part are installed on the unit guide;

at least one pressure part configured to pressurize the display unit toward the panel member and disposed within the display case; and a cover coupled to the connecting member and configured to cover the display insertion hole, wherein the sensing part of the display unit senses a touch of a user when the user touches the panel member.]

[2. The refrigerator according to claim 1, wherein the display case is coupled to the connecting member.]

[3. The refrigerator according to claim 1, wherein the display case is closely adhered to the panel member in a state where the display unit is mounted on the display case.]

[4. The refrigerator according to claim 1, wherein the panel member includes mounting guides coupled to the display unit, and wherein the display unit includes guide ribs coupled to the mounting guides.]

[5. The refrigerator according to claim 1, wherein the display unit is slidingly mounted on the display case, wherein the display unit includes guide parts guiding the mounting of the display unit, and wherein the display case includes guide rails guiding the sliding of the guide parts.]

[6. The refrigerator according to claim 1, wherein the panel member includes a manipulating part guiding the position of the sensing part, wherein a display window is formed in the position corresponding to the display part, and wherein the display window is formed to be transparent or translucent.]

[7. A refrigerator having a main body in which a storage chamber is formed and a door to open/close the storage chamber, the door comprising:

a panel member that forms at least a portion of a front exterior of the door;

an inner case that forms at least a portion of a rear exterior of the door, at least a portion of the inner case being spaced from the panel member;

a deco member that forms at least one of a side, upper or lower exterior of the door;

a display case installed on a rear surface of the panel member;

insulating material filled in a space defined by the panel member, the deco member and the inner case;

a display inserting part formed on the deco member;

a display unit mounted on the display case after the filling of the insulating material is completed, the display unit penetrating through the display inserting part, the display unit having a display part, a sensing part and a unit guide, wherein the display part and the sensing part are installed on the unit guide;

at least one pressure part configured to pressurize the display unit toward the panel member and disposed within the display case; and a cover coupled to the deco member and configured to cover the display inserting part, wherein the sensing part senses a touch operation of the panel member.]

*8. A refrigerator, comprising:*

*a cabinet having a storage space;*

*a door opening and closing the storage space, the door comprising:*

*a panel member provided with a display window which is spaced apart from an edge of the panel member, and configured to form a front exterior of the door of the refrigerator, and a pattern on a rear surface of the panel member;*

*an inner case spaced apart from the panel member and configured to form a rear exterior of the door of the refrigerator;*

*a deco member that connects the panel member and the inner case to form at least a side, upper or lower exterior of the door and having an inserting part;*

*a display case disposed within a space defined by the panel member, the inner case, and the deco member, the display case being installed on a rear surface of the panel member, the display case including a first side wall, a second side wall that faces the first side wall, a rear wall that connects the first side wall and the second side wall to define a receiving space, a first opening facing a rear surface of the panel member, and a second opening communicating with the inserting part; and*

*insulating material filled in a space defined by the panel member, the inner case, the deco member and the display case so that the insulating material contacts with the panel member, the inner case, the deco member and the display case;*

*a display unit inserted into the receiving space of the display case through the inserting part and the second opening, the display unit being mounted on the display case, the display unit comprising:*

*a sensing part to sense a touch manipulation of a user;*

*a display part mounted on a printed circuit board;*

*a unit guide on which the printed circuit board is mounted and has an elongated flat shape; and*

*guide ribs protruding from the unit guide; and*

*mounting guides spaced apart from each other and mounted on the rear surface of the panel member to guide a mounting location of the unit guide of the display unit and protruded toward a rear surface of the inner case,*

*wherein the mounting guides are separate components from the deco member and the display case,*

*wherein the printed circuit board is positioned between the guide ribs,*

*wherein the mounting guides are located within the receiving space of the display case to prevent the mounting guides from contacting the insulating material, and*

*wherein the guide ribs are coupled to the mounting guides when the display unit is inserted in the display case.*

*9. The refrigerator of claim 8, wherein the display window is formed to be transparent or translucent.*

*10. The refrigerator of claim 8, wherein the display part is a liquid crystal display.*

*11. The refrigerator of claim 8, wherein the unit guide is mounted on the display case.*

*12. The refrigerator of claim 8, wherein the panel member is formed of glass or plastic material.*

*13. The refrigerator of claim 8, wherein a manipulation part to be touched by the user for manipulating is printed or formed in a rugged shape on the panel member corresponding to the sensing part.*

*14. The refrigerator of claim 8, wherein the deco member comprises cap decoes, and one of the cap decoes includes the inserting part.*

*15. The refrigerator of claim 8, further comprising a cover member to cover the inserting part after the display unit is inserted into the receiving space of the display case.*

*16. The refrigerator of claim 15, wherein the cover member comprises a shielding part to shield the inserting part and mount parts extended to both sides of the shielding part to be coupled to the deco member.*

*17. The refrigerator of claim 8, further comprising a pressure part configured to pressurize the unit guide toward the rear surface of the panel member.*

*18. The refrigerator of claim 17, wherein the pressure part is disposed on the display case.*

*19. The refrigerator of claim 18, wherein the pressure part includes an inclined surface inclined toward the rear surface of the panel member.*

*20. The refrigerator of claim 8, wherein the mounting guides are formed of plastic material to be attached to the rear surface of the panel member.*

*21. The refrigerator of claim 8, wherein the display case is coupled to an inner surface of the deco member.*

*22. The refrigerator of claim 8, wherein the display part faces the display window when the unit guide is inserted in the receiving space through the inserting part and the second opening.*

*23. The refrigerator of claim 8, wherein the insulating material is filled and foamed in the space defined by the panel member, the inner case, the deco member and the display case.*

*24. The refrigerator of claim 8, wherein the display case further comprises a bending part, and*

*a front surface of the bending part is closely adhered to the rear surface of the panel member.*

*25. A refrigerator, comprising:*

*a cabinet having a storage space;*

*a door opening and closing the storage space, the door comprising:*

*a panel member provided with a display window which is spaced apart from an edge of the panel member, and configured to form a front exterior of the door of the refrigerator, and a pattern on a rear surface of the panel member;*

*an inner case spaced apart from the panel member and configured to form a rear exterior of the door of the refrigerator;*

*a deco member that connects the panel member and the inner case to form at least a side, upper or lower exterior of the door and having an inserting part;*

*a display case disposed within a space defined by the panel member, the inner case, and the deco member, the display case being installed on a rear surface of the panel member, the display case including a first side wall, a second side wall that faces the first side wall, a rear wall that connects the first side wall and the second side wall to define a receiving space, a first opening facing a rear surface of the panel member, and a second opening communicating with the inserting part; and*

*insulating material filled in a space defined by the panel member, the inner case, the deco member and the display case so that the insulating material contacts with the panel member, the inner case, the deco member and the display case;*

*a display unit inserted into the receiving space of the display case through the inserting part and the second opening, the display unit being mounted on the display case, the display unit comprising:*

*a sensing part;*

*a display part mounted on a printed circuit board;*

*a unit guide on which the printed circuit board is mounted and has an elongated flat shape; and*

*guide ribs protruding from the unit guide; and*

*mounting guides spaced apart from each other and mounted on the rear surface of the panel member to guide a mounting location of the unit guide of the display unit and protruded toward a rear surface of the inner case,*

*wherein the printed circuit board is positioned between the guide ribs,*

*wherein the mounting guides are separate components from the deco member and the display case,*

*wherein the mounting guides are located within the receiving space of the display case to prevent the mounting guides from contacting the insulating material, and*

*wherein the guide ribs are coupled to the mounting guides when the display unit is inserted in the display case.*

* * * * *